United States Patent Office 3,294,778
Patented Dec. 27, 1966

3,294,778
FIBER-REACTIVE DYESTUFFS
David Irwin Randall, Easton, Pa., and Wilhelm Schmidt-Nickels, Little York, N.J., assignors to General Aniline & Film Corporation, New York, N.Y., a corporation of Delaware
No Drawing. Filed Sept. 14, 1964, Ser. No. 396,351
The portion of the term of the patent subsequent to Feb. 16, 1982, has been disclaimed
6 Claims. (Cl. 260—163)

This application is a continuation-in-part of our co-pending application Serial No. 153,688 filed November 20, 1961, now abandoned.

This invention relates to a novel fiber-coloring process, and to a novel group of chromophoric compounds or dyestuffs useful in such process.

A number of dyeing processes are known in which dyeings of improved fastness properties are obtained by reaction between the dyestuffs and the fiber. Among the large number of reactive dye classes proposed for use in such processes, relatively few are commercially useful. Representative of a major proportion of such commercially useful reactive dye classes are the cyanuric, the pyrimidine and the vinylsulfone or sulfatoethylsulfone types. These types are somewhat expensive to produce and are generally not sufficiently stable to or applicable in the wide range of pH conditions often found necessary in treating different types of fibers. Further, the dyeings produced with these dyestuffs have more or less tendencies to hydrolyze with cleavage of the dye-fiber linkage. For example, the dyestuff-fiber linkages derived from the cyanuric and pyrimidine types of reactive dyes hydrolyze on standing in dilute acids. On the other hand, the dyestuff-fiber linkages derived from reactive dyestuffs of the vinylsulfone or sulfatoethylsulfone type are not stable to attack by strong aqueous alkalies. In addition, the number of reactive groups substituted in the dyestuff molecule is usually limited whereby the dyestuff may contain an insufficient number of such groups for attainment of the desired solubility and optimum reactivity with textile fibers.

Sulfato- and halo-ethylaminomethyl groups have been proposed as suitable for insertion into dyestuff molecules but, due to limitations in their method of manufacture and the like, such dyestuffs generally contain an insufficient number of fiber-reactive groups to impart the desired fiber-reactivity during dyeing and the desired fastness properties of the resulting dyeings.

It is an object of this invention to provide a class of novel dyestuffs, and a process for coloring fibers therewith, which will not be subject to one or more of the above disadvantages. Another object of this invention is the provision of such a class of dyestuffs which is relatively more reactive towards textile fibers and the like. Still another object of this invention is the provision of a process for employing such a class of dyestuffs for dyeing fibers to produce dyeings having improved properties such as fastness and/or brightness and the like. A further object of the invention is the provision of such a class of dyestuffs which may be readily manufactured without undue degradation of the dyestuff and other undesired effects. Other objects and advantages still appear as the description proceeds. The attainment of the above objects is made possible by this invention which is based upon the discovery that colored fibers with improved properties can be obtained by treating fibers containing a reactive hydrogen atom in the presence of an acid-binding agent with an organic dyestuff which may be generally defined as one containing at least one fiber-reactive group of the type formula (I) 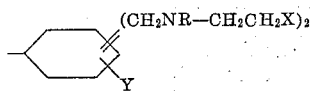

indirectly bonded to a nuclear carbon atom in the dyestuff molecule through a linking moiety containing at least one N atom, wherein X is the anion of a strong acid, Y is H, lower alkyl or lower alkoxy, such as methyl, ethyl, methoxy or ethoxy, and R is —CH$_2$CH$_2$X or an inert substituent radical such as alkyl, cycloalkyl, aryl, or heterocyclic. A specifically preferred fiber-reactive group of the above type formula is the radical of the formula (II) 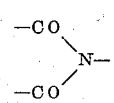

joined to an aromatic nuclear carbon atom in the dyestuff molecule through a linking moiety selected from the group consisting of —N=N—, —SO$_2$NH—,

—CH$_2$NH—, —CONH—, —NH—, and $$\begin{matrix} -CO \\ \phantom{-}\searrow\mkern-6mu N- \\ -CO \nearrow \end{matrix}$$

In this preferred radical, X is preferably chloro, bromo, sulfato, phosphato, or benzenesulfonyloxy.

It has been found that dyestuffs of the above formula are readily and economically manufactured, relatively speaking, and are readily applied from an aqueous medium to fibers and the like by dyeing, padding and printing for the production of improved dyeings. Unexpectedly improved fiber-reactivity and fastness properties are attained by reason of the relatively greater number of fiber-reactive groups in the dyestuff molecule and the increased activation of such groups by reason of their double substitution into the single depicted benzene nucleus, particularly when in the preferred meta positions.

The fiber reactive groups of the above formula may be part of the chromophore in the chromophoric compound or dyestuff to be employed for coloring fibers, or they may be added to or substituted into a known organic dyestuff molecule or chromophoric compound. In general, dyestuffs containing the above defined fiber-reactive groups are well known and of aromatic character in containing at least one carbocyclic or heterocyclic ring, being generally selected from a group consisting of azo, quinoid, indigoid, thioindigoid, di- and tri-aryl-methane and -amine, xanthene, acridine, azine, oxazine, thiazine, stilbene, and sulfur dyestuffs. Venkataraman's "Chemistry of Synthetic Dyes," Academic Press, N.Y., 1952, Volumes I and II discloses a multitude of such organic dyestuffs which may be provided with a fiber reactive group of the above formula. A preferred group of dyestuff for employment herein are the azo, anthraquinone, nitro, perylene carboxylic acid imide, and oxazine dyestuffs. Optionally, the above defined fiber-reactive group of the present invention may be bonded to the residue of a chromophoric or colorless compound containing groups enabling conversion to a dyestuff in situ on the fiber, as for example a group promoting coupling with a diazotized primary aromatic amine, or a diazotizable primary amine group whereby the coloration may be produced in situ on the fiber after reaction of the above defined chromophoric compound with the fiber by suitable development as by, respectively, reaction with a diazotized primary aromatic amine or diazotization and reaction with a coupling component of known type. Other mechanisms and/or groupings are of course known for developing color in situ on the fiber, including metallizing, reducing and/or oxidizing treatments and the like.

In the above formula, X preferably represents sulfato or chloro, and less preferably bromo, phosphato or benzenesulfonyloxy, all these groups having been found to be highly effective termini for attaining the desired fiber reactivity in the dyestuffs containing the same. Generally however X may represent the anion of any other strong acid having a dissociation constant greater than $2.0 \times 10^{-5}$ including for example the anions of hydrofluoric, hydroiodic, phosphonic, phosphinic, trichloracetic, dichloracetic, chloracetic, formic and the like.

The fiber-reactive group of the present invention may be linked to an aromatic nuclear carbon atom in the dyestuff molecule through any desired linking moiety in manners well known in the art. In addition to the preferred linking moieties referred to above in connection with the radical of Formula II, any other monoatomic, diatomic or polyatomic linking moiety may be employed for binding the fiber-reactive group into the dyestuff molecule. Illustratively, other suitable bridging links include —O—, —NHSO$_2$—, —SO$_2$NHNH—, —CH$_2$—, —(—CH$_2$—)$_m$—, wherein $m$ has a value of 2 to 18, —CH$_2$SO$_2$—, —CH$_2$S—, —CH$_2$O—, —CO—, —S—, —SO$_2$—, —NHCO—, —SCH$_2$—, and the like, the actual linking atoms in such bridging links being generally C, S, O, or N or any combination thereof. Any of the aforementioned linking moieties may be combined in any manner, number and/or order. Methods for producing dyestuffs of the present type containing such linking moieties are known and will otherwise become apparent to persons skilled in the art.

According to a preferred embodiment of the invention, the fiber-reactive dyestuffs employed herein are derived from intermediates having one of the following formulae (III)
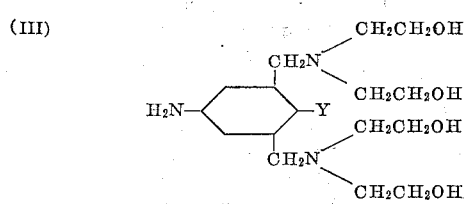

(IV)
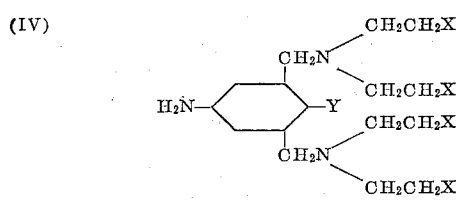

The above intermediates, and methods for their production are disclosed and claimed in our copending application Serial No. 396,410, now Patent No. 3,271,435, filed on even date herewith. In general, these intermediates may be prepared by bis-chloromethylation of nitrobenzene, p-nitrotoluene or p-nitroanisole or the like, reaction of the resulting bis-chloromethylated nitrobenzene of the formula (V)
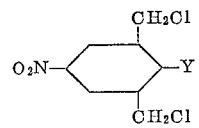

with diethanolamine to produce an intermediate of the following formula

I
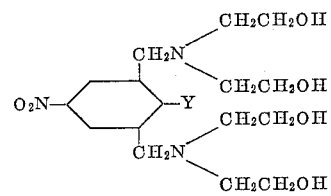

followed by reduction of the nitro group to amino as by catalytic hydrogenation under pressure in ethanol in the presence of platinum oxide catalyst (Adams catalyst) to produce the intermediate of Formula III above. The latter intermediate may then be reacted with a suitable esterifying agent in known manner to replace the terminal OH groups by X yielding the intermediate of Formula IV above. Preferred esterifying agents are HCl or thionyl chloride in chloroform (X=Cl), HBr (X=Br), 100% sulfuric acid or oleum (X=sulfato), phospholeum (X=phosphato), and benzene disulfonyl chloride (X=benzene sulfonyloxy). It will be understood however that any other suitable esterifying agent may be employed for providing the intermediate with the other values for X referred to previously.

The intermediate of Formula IV may be employed in making a fundamental dyestuff molecule operative herein as for example by diazotization and coupling with known coupling components, and by other procedures, or it may be reacted with a known dyestuff containing a radical reactive with the amino group in the intermediate such as an —SO$_2$Cl radical resulting in a —SO$_2$NH— linking moiety, a —CH$_2$Cl radical resulting in a —CH$_2$NH— linking moiety, a —CONH$_2$ radical resulting in a —CONH— linking moiety, or a bromide or chloride radical resulting in an —NH— linking moiety.

Alternatively, the same dyestuffs may be employed using the intermediate of Formula III above except that the terminal OH groups must finally be replaced by X by reaction with a suitable esterifying agent as described above.

The aforementioned linking moieties present in the fiber-reactive groups of this invention do, as stated, link the fiber-reactive group with an aromatic nuclear carbon atom in the dyestuff. Such carbon atom is part of a phenyl nucleus or a substituted or fused ring derivative thereof such as naphthyl, anthryl, anthraquinonyl, naphthaquinonyl, dibenzanthronyl, and the like, and substituted derivatives thereof.

The fiber-reactive dyestuffs of the present invention are highly effective for coloring natural and synthetic fibers, particularly cellulosic textile fibers, in any desired shades of good to excellent fastness properties. The coloring process involves dyeing (including printing) the fibrous materials by application thereto under acid-binding conditions of an aqueous medium containing the defined dyestuff containing at least one fiber-reactive group as described above at any temperature ranging from ambient temperatures to the boiling point of the medium. The medium may have a pH ranging from about 4 to 14 although generally neutral to alkaline conditions are preferred. It will be understood that as employed herein, the term "aqueous medium" is intended to include preferred aqueous solutions in addition to dispersions or stable colloidal suspensions of the reactive dyestuff, properly thickened in known manner when employed in a printing process. The aqueous medium may be applied by immersion, jig dyeing, padding, spraying, printing, or in any other desired manner. The reactive dyestuffs of the present invention are preferably water soluble or water dispersible to facilitate application from the above-described aqueous medium. Quite often, embodiments of the present dyestuffs wherein X is sulfato or phosphato are water soluble by reason of the water-solubilizing activity of such termini. However, where these and other dyestuffs of the invention are insufficiently soluble, they may be rendered more water soluble in known manner by inclusion in the dyestuff molecule of one or more sulfonic or carboxylic acid groups.

Although aqueous media are disclosed and claimed in the present process, it will be understood that this is only the preferred embodiment and that the water in the aqueous medium may be replaced in whole or in part by a water miscible, polar organic solvent such as acetone, alcohol, dioxazine, dimethylformamide, or the like without departing from the scope of this invention. It will be likewise understood that the medium containing the reactive dyestuffs of the present invention may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids and the like, buffering agents such as mixtures of monosodium and disodium or potassium phosphates or arylsulfonamides, and protective colloids and thickening agents for the production of printing pastes such as methyl cellulose, starch, gum arabic, gum tragacanth, locust bean gum, sodium alginate, and the like.

The reaction between the reactive dyestuff and the fiber containing a reactive hydrogen atom involves liberation of acid HX and the reaction is accordingly favored by acid-binding conditions. As acid-binding agents which may be added to the medium containing the reactive dyestuff or applied to the fiber prior or subsequent thereto, there may be mentioned generally alkali metal (sodium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% or more based on the weight of the aqueous medium containing the reactive dyestuff. Instead of the above mentioned acid-binding agents, a substance may be employed which liberates an acid-binding agent upon subsequent subjection to elevated temperatures. An example of such a substance is sodium trichloroacetate, and the use of such a substance requires subsequent application of elevated temperatures such as by dry heat or steam.

It should be noted however that in many instances, the provision of the required acid-binding conditions does not require the addition of any of the above mentioned actual or potential acid-binding, alkaline reacting agents. This is because the fiber-reactive dyestuffs of the invention, which are usually applied in concentrations of about 0.5 to 10% or more in the medium or O.W.F. (on the weight of the fiber), contains basic amino groups which tend to bind the acid liberated in the reaction. It is accordingly feasible, and sometimes preferable to carry out the dyeing process under acidic conditions, particularly when dyeing fibers sensitive to alkali such as neutral or synthetic proteinaceous fibers and the like.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Usually, the fiber is continuously padded with the fiber-treating medium containing the chromophoric compound, squeezed to, for example, a 50 to 200% liquor pickup, dried and heated at 90 to 350° C. for an hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. As a result of the reactive dyeing process of the invention, such dyed or printed fibers are bonded and cross linked to the fiber-reactive dyestuffs of the invention through the depicted terminal —$CH_2CH_2$— groups with liberation of the terminal X radicals from such groups and the reactive hydrogen atoms (for example in the OH groups in cellulose) in the fiber. As pointed out above, the cross linking reaction leading to enhanced fastness properties and the like is favored and/or accelerated by reason of the described double substitution of the fiber-reactive groups in the same nucleus, particularly in the meta positions in the depicted benzene ring.

In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. As representative of such other fibers, there may be mentioned natural and synthetic proteinaceous fibers such as wool, silk, leather, animal hides and skins, casein, and zein, polyamides such as the 6-, and 6.6-nylons and polypyrrolidone, polyurethanes, polyesters, copolymers or homopolymers containing recurring carboxylic or cyano or amide linear or side groups, polyvinyl alcohol, partially hydrolyzed cellulose acetate and polyvinyl acetate, polyvinyl chloride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of a staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

*Example 1*

A charge of
250 parts by volume ethanol, 52.4 parts diethanolamine, and
23.2 parts 2,6-bis-chloromethyl-4-nitrotoluene is stirred at 60° C. for ½ hour and then at reflux for 2 hours. Then
220 parts by volume ethanol are distilled off through a downward condenser. The remaining liquid is poured into
500 parts by volume water.

The pH of the solution is raised to 10 by the addition of 20% $Na_2CO_3$ solution. The reaction product is salted out by the addition of 230 parts by weight sodium chloride. The precipitate is filtered and dried. The product has the formula:

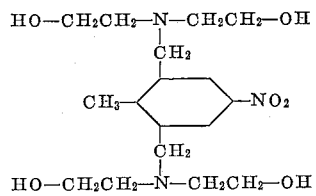

For the catalytic reduction of the nitro group a pressure shaker is charged with 200 parts by volume ethanol.
17.1 parts of the nitro compound and
0.2 part platinum oxide catalyst (Adam's catalyst).

Hydrogen is charged to a pressure of 60 lbs. While the charge is shaken, the pressure falls to 48 lbs. within 1 hour and 45 minutes and remains constant. After removal of the catalyst by filtration, the alcohol is evaporated. The remaining compound has the formula:

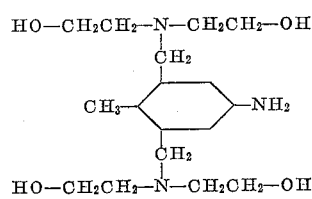

Example 2

18.4 parts of the product of Example 1 are introduced into 170 parts by volume chloroform. To the solution is added under vigorous agitation 19.7 parts by volume thionyl chloride.

A precipitate forms. The charge is stirred at reflux for 2 hours. The reaction product settles at the bottom of the reaction vessel. The liquid is decanted from the settled product at room temperature. The compound has the formula:

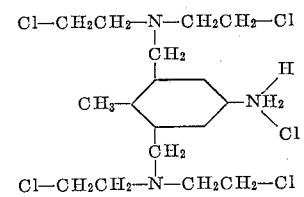

Example 3

12 parts of the product of Example 1 are introduced into 115 parts by volume conc. hydrochloric acid (36%).

The solution is heated at 73° C. for 1 hour and 10 minutes and then evaporated to dryness. The product is identical with the compound of Example 2.

Example 4

(a)

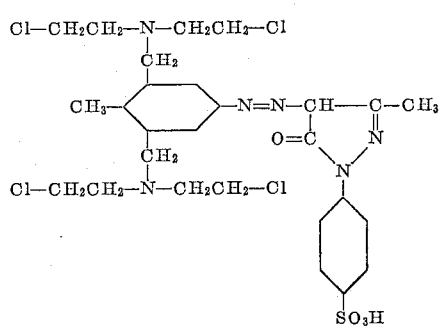

10 parts by weight of the product of Example 2 are dissolved in
70 parts by volume water and 5 parts of volume conc. hydrochloric acid (36%) and diazotized at 0–5° C. which requires
11.5 parts by volume of 10% (weight/volume) sodium nitrite solution (=1.15 parts by weight of $NaNO_2$).

The diazonium solution is stirred at 0–5° C. alternatingly with 20% sodium hydroxide solution into a solution of
70 parts by volume water and
7.1 parts 1-(4-sulfophenyl)-3-methylpyrazoline-5, 60% (=4.2 parts by weight 100%) in such a way that a pH of around 7 is maintained. The dyestuff is precipitated from its solution by the addition of
20 parts sodium chloride and filtered off. It has the above formula.

(b) Three parts of the above dyestuff are dissolved in 100 parts of water containing 3 parts soda ash. Cotton sheeting is padded at room temperature with the dye solution, squeezed, dried, heat cured at 150° C. for 3 minutes, rinsed, soaped 5 minutes at the boil in an aqueous solution containing 0.25% soda ash and 0.25% Igepal CO-630 (polyoxyethylenated nonyl phenol), rinsed again and dried. A bright yellow dyeing is obtained having excellent wash fastness and good fastness to acid and alkaline perspiration and wet and dry crocking. Similar results are obtained using 2 parts of caustic soda in the dye solution instead of the 3 parts of soda ash.

(c) Cotton sheeting is dyed for 20 minutes at 95° C. in a 3% alkaline dye solution as employed in (b) above, rinsed, soaped, rinsed again and dried. Dyeings with similar properties are obtained.

(d) Three parts of the above dye and 10 parts of urea are dissolved in 40 parts of water at 120–140° F. This solution is poured into 45 parts of sodium alginate thickener (4% solution Keltex S). Two parts of soda ash are dissolved in this paste at 80° F. and the paste printed on cotton goods, dried and steamed 5–10 minutes at atmospheric pressure in a neutral steamer. The goods are then rinsed cold, soaped at the boil, rinsed again and dried. A bright yellow print with excellent fastness properties is obtained.

(e) Cotton goods are printed as in (d) above, but instead of steaming, the color is fixed by heating in an oven at a temperature of 200–360° F. Similar bright yellow prints are obtained.

Example 5

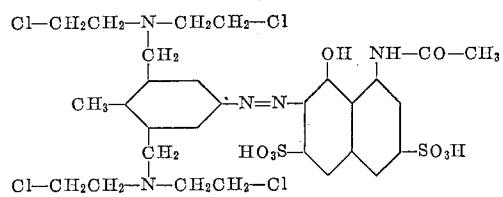

10 parts of the product of Example 2 are diazotized and the diazonium solution stirred at 0–5° C. into a solution of 50 parts by volume water, 43.5 parts by volume 14.5% (weight/volume) Acetyl H Acid (=6.3 parts by weight 100%) and 11 parts by volume 20% sodium hydroxide solution. During the coupling the pH is held around 7. To maintain this condition it is necessary to add during the coupling 4 parts by volume 20% sodium hydroxide solution.

The dyestuff of the above formula is precipitated from its solution by the addition of 20 parts by weight sodium chloride, filtered off and sucked dry on the filter. When it is applied to cotton by the procedures of Example 4(b)–(e) above, strong pink dyeings and prints are obtained having similar fastness properties.

*Example 6*

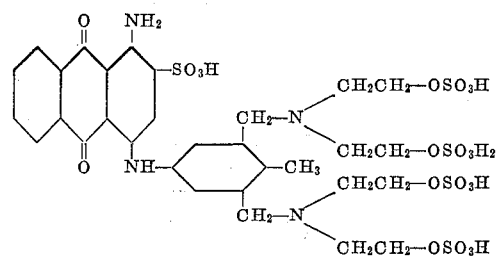

A charge of 100 parts water,
7.6 parts 1-amino-4-bromoanthraquinone-2-sulfonic acid,
2.1 parts soda ash,
8.2 parts of the product of Example 1, and
0.5 part by weight cryst. copper sulfate are stirred at 80° C. for 6½ hours. From the blue solution the product is precipitated by adding at room temperature equal amounts of sodium and potassium chloride. The dyestuff settles on the bottom. The product is dried. For the formation of the sulfuric acid ester it is introduced gradually under cooling into 100% $H_2SO_4$ at temperatures below 20° C. Finally the charge is stirred at room temperature overnight and then stirred into ice. The resulting dyestuff of the above formula gives strong blue dyeings and prints of similar fastness properties when applied by the procedures of Example 4(b)–(e) above.

*Example 7*

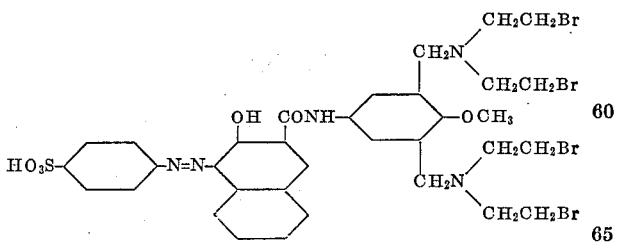

The procedures of Examples 1 and 3 above are repeated except that the 2,6-bis-chloromethyl-4-nitrotoluene is replaced by 2,6-bis-chloromethyl-4-nitroanisole, and the hydrochloric acid in Example 3 is replaced by hydrobromic acid, a compound being thereby obtained having the formula shown in Example 2 except for replacement of the —Cl and $CH_3$ groups by, respectively, —Br and —$OCH_3$. Such compound is employed for amidating 2-hydroxy-3-naphthoic acid in known manner to produce the Naphthol AS type coupling component of the formula

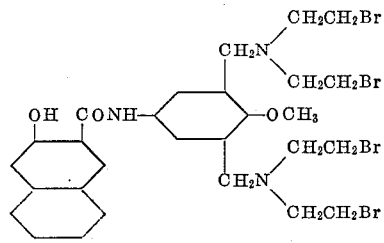

The above coupling component is reacted in known manner with diazotized anthranilic acid to produce the azo dyestuff of the above formula. The dyestuff yields strong red dyeings and printings of good to excellent fastness properties when applied to cotton by the procedures described in Example 4(b)–(e) above.

*Example 8*

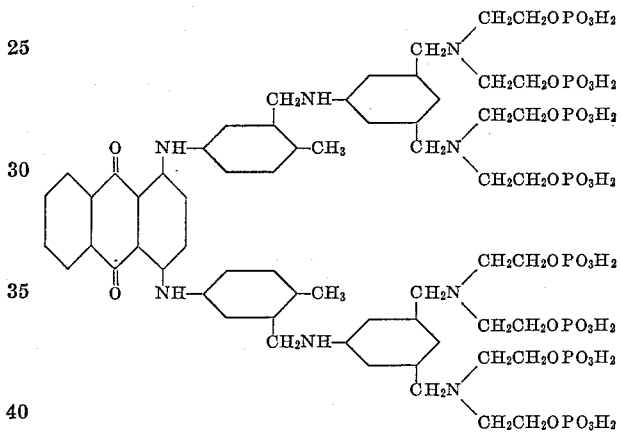

The procedure of Example 1 is repeated except that the 2,6-bis-chloromethyl-4-nitrotoluene is replaced by 2,6-bis-chloromethyl-4-nitrobenzene, the resulting compound having the formula last shown in Example 1 except for omission of the —$CH_3$ group. A mixture of 2.2 moles of this compound and 1 mole of the bis-chloromethyl-atedarylamino anthraquinone dyestuff of the formula

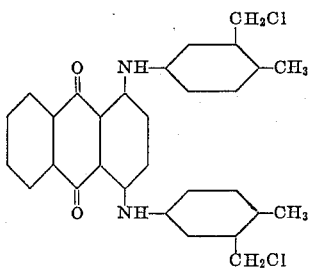

in dimethylformamide is heated at 150° C. for one hour and the resulting dyestuff phosphated by pouring the mixture into phospholeum ($P_2O_5$–$H_3PO_4$). The mixture is then drowned in water, the insoluble by-products filtered off, and the dyestuff salted out of the filtrate by the addition of sodium chloride, filtered off and dried. The resulting dyestuff of this example having the formula first given above, when applied to cotton by the procedures described in Example 4(b)–(e) above, yields strong olive green dyeings and prints having similarly improved fastness properties.

Example 9

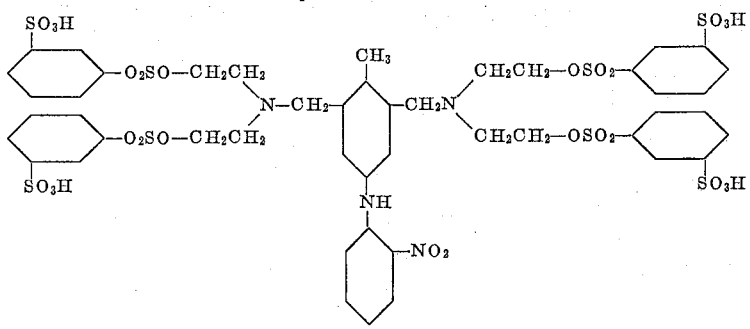

One mole of o-nitrochlorobenzene and 1.1 moles of the product of Example 1 above in 1 liter of alcohol are heated to 115° C. in an autoclave for 2 hours. The alcohol is evaporated off and the resulting yellow dye is added to a solution of benzene disulfonyl chloride in pyridine. The resulting mixture is heated at about 40° C. for about an hour, the mixture cooled and drowned in cold water after which it is adjusted to a pH of about 6.0 with 50% potassium hydroxide solution and the pyridine and water mixture distilled off by vacuum at temperatures below 60° C. After all the pyridine is removed, the aqueous solution is evaporated on a steam bath and dried under vacuum. The resulting dyestuff of the above formula when applied to cotton by the procedures of Example 4(b)–(e) above, yields yellow dyeings and prints of good to excellent fastness properties.

Example 10

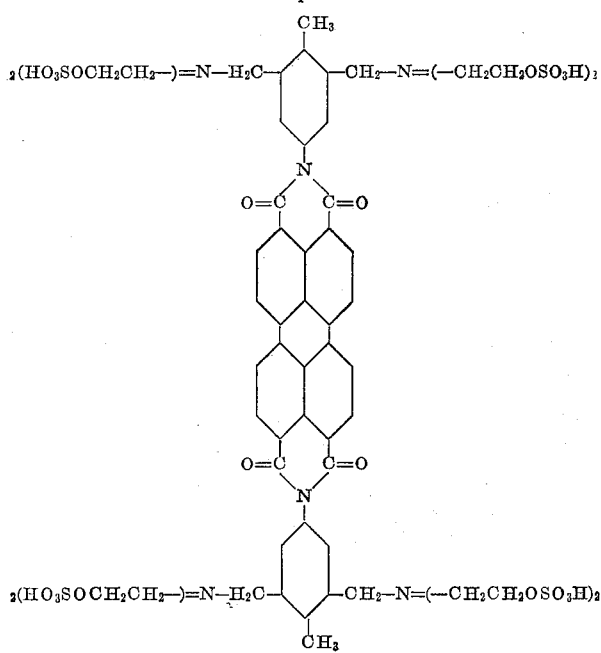

One mole of perylene tetracarboxylic acid dianhydride and 2.5 moles of the product of Example 1 in 1 kilogram of phenol is refluxed for 18 hours. The reaction mixture is cooled to 45° C. with stirring and diluted with 1 kilogram of methanol and stirred for several hours. The mixture is filtered and the red precipitate washed with methanol and dried. The product is sulfated by dissolution in cold conc. $H_2SO_4$ and recovered by salting out and washing with salt solution. The resulting dyestuff of the above formula, when applied to cotton by the procedures of Examples 4(b)–(e) above, yields red dyeings and prints of similarly improved fastness properties.

Example 11

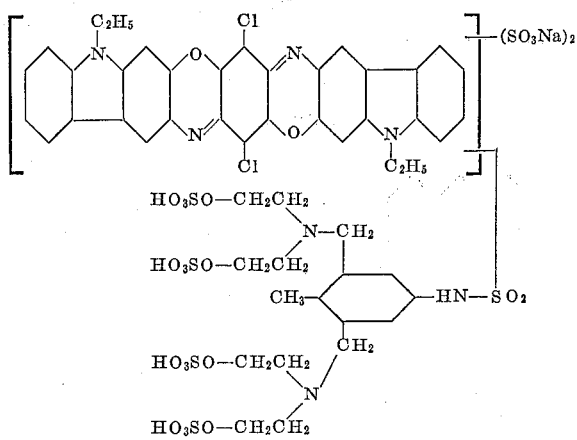

Sulfonated dioxazine sulfonyl chloride is gradually added to an approximately equimolar amount of the product of Example 1 in water at 15° C. for 18 hours while maintaining the pH at 6 to 7. The product is sulfated by treatment with cold conc. sulfuric acid. The sulfate ester is salted out, filtered and dried. The resulting dyestuff of the above formula, when applied to cotton by the procedures of Example 4(b)–(e) above, yields bright navy blue dyeings and prints of similarly good to excellent fastness properties.

Example 12

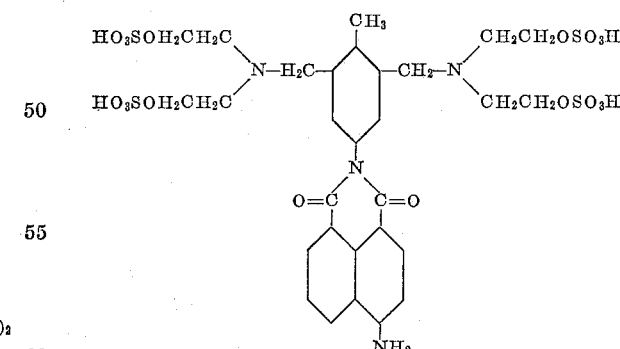

One mole of 4-nitrophthalic anhydride is reacted with about one mole of the product of Example 1 in water at 100° C. for 15 hours at pH 7.5. The nitro product is filtered, washed and reduced by treatment with boiling sodium sulfide solution. The amino product is recovered by filtration, washed neutral, dried and dissolved in cold conc. $H_2SO_4$. The sulfate ester is isolated by salting out and filtration. The resulting dyestuff of the above formula, when applied to cotton by the procedures of Example 4(b)–(e) above, yields bright fluorescent yellow dyeings and prints of similar good to excellent fastness properties.

This invention has been disclosed with respect to certain preferred embodiments and it will be understood that various modifications and variations thereof will become obvious to persons skilled in the art. It will for example

We claim:

1. A dyestuff selected from the group consisting of azo, anthraquinone, nitro, perylene carboxylic acid imide, and oxazine dyestuffs containing a radical of the formula

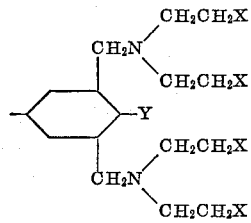

joined to an aromatic nucleus in the dyestuff molecule through a moiety selected from the group consisting of —N=N—, —SO$_2$NH—, —CH$_2$NH—, —CONH—, —NH—, and

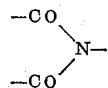

wherein
X is an anion selected from the group consisting of chloro, bromo, sulfato, phosphato, and benzenesulfonyloxy, and Y is selected from the group consisting of —H, —CH$_3$ and —OCH$_3$.

2. An azo dyestuff as defined in claim 1 wherein said moiety is —N=N—, X is chloro, and Y is —CH$_3$.

3. An anthraquinone dyestuff as defined in claim 1 wherein said moiety is —NH—, X is sulfato, and Y is —CH$_3$.

4. A nitro dyestuff as defined in claim 1 wherein said moiety is —NH—, X is sulfato, and Y is —CH$_3$.

5. A perylene carboxylic acid imide dyestuff as defined in claim 1 wherein said moiety is

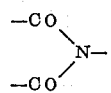

X is sulfato, and Y is —CH$_3$.

6. An oxazine dyestuff as defined in claim 1 wherein said moiety is —SO$_2$NH—, X is sulfato, and Y is —CH$_3$.

References Cited by the Examiner

UNITED STATES PATENTS

| | | | |
|---|---|---|---|
| 3,019,268 | 1/1962 | Buc et al. | 260—314.5 X |
| 3,066,005 | 11/1962 | Wedemeyer et al. | 8—54.2 |
| 3,169,822 | 2/1965 | Randall et al. | 8—1.28 |

FOREIGN PATENTS

| | | |
|---|---|---|
| 733,471 | 7/1955 | Great Britain. |
| 846,505 | 8/1960 | Great Britain. |

OTHER REFERENCES

Derwent, Belgian Report No. 54B, pages C1 and C2, July 15, 1959; Belgian Patent 573,466.

NORMAN G. TORCHIN, *Primary Examiner.*

D. LEVY, J. HERBERT, *Assistant Examiners.*

UNITED STATES PATENT OFFICE
CERTIFICATE OF CORRECTION

Patent No. 3,294,778  
December 27, 1966

David Irwin Randall et al.

It is hereby certified that error appears in the above numbered patent requiring correction and that the said Letters Patent should read as corrected below.

Column 4, lines 10 to 18, for the formula identification numeral "I" read -- (VI) --; column 5, line 42, before "lithium" insert -- potassium, --; line 67, for "neutral" read -- natural --; column 9, lines 22 to 32, for that portion of the formula reading "—$OSO_3H_2$" read -- —$OSO_3H$ --.

Signed and sealed this 21st day of January 1969.

(SEAL)  
Attest:

Edward M. Fletcher, Jr.  
Attesting Officer

EDWARD J. BRENNER  
Commissioner of Patents